(12) United States Patent
Shampine et al.

(10) Patent No.: US 9,841,523 B2
(45) Date of Patent: Dec. 12, 2017

(54) TUBE WAVE GENERATION

(71) Applicant: Schlumberger Technology Corporation, Sugar Land, TX (US)

(72) Inventors: Rod William Shampine, Houston, TX (US); Adam Keilers, Richmond, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 14/967,971

(22) Filed: Dec. 14, 2015

(65) Prior Publication Data

US 2016/0103235 A1    Apr. 14, 2016

Related U.S. Application Data

(63) Continuation-in-part of application No. 13/015,985, filed on Jan. 28, 2011, now Pat. No. 9,453,404.
(Continued)

(51) Int. Cl.
*G01V 1/00* (2006.01)
*G01V 1/44* (2006.01)
(Continued)

(52) U.S. Cl.
CPC .......... *G01V 1/44* (2013.01); *E21B 47/0005* (2013.01); *E21B 47/091* (2013.01);
(Continued)

(58) Field of Classification Search
CPC . E21B 21/01; G01V 1/40; G01V 1/42; G01V 1/44; G01V 1/52
See application file for complete search history.

(56) References Cited

U.S. PATENT DOCUMENTS 2,751,183 A    6/1956   Crookston
3,254,524 A    6/1966   Tannenberg
(Continued)

FOREIGN PATENT DOCUMENTS

CA    2037277 A1    1/1992
WO    2009086279 A2    7/2009

OTHER PUBLICATIONS

Laake et al., "A Generator for High Pressure Pulses in Liquids", Journal of Sound and Vibration, vol. 131, No. 2, 1989, pp. 295-304.
(Continued)

*Primary Examiner* — Hovhannes Baghdasaryan
(74) *Attorney, Agent, or Firm* — Andrea E. Tran

(57) ABSTRACT

A method to generate a tube wave in a tubular system involves reciprocating a plunger in a chamber system to alternatingly increase and decrease net volume, drawing fluid from and returning the fluid to a tubular system and into and from the chamber system, to generate a tube wave, and guiding the tube wave to the tubular system. Also, a tube wave generator-sensor system has a chamber system, a plunger, a driver to reciprocate the plunger within the chamber system to generate a tube wave, a flow passage to guide the tube wave into a tubular system, and a sensor to receive the tube wave signal and/or response from the tubular system. The method and system can work with or without a firing valve and or accumulator, without adding or subtracting fluid from the tubular system.

25 Claims, 10 Drawing Sheets

Related U.S. Application Data

(60) Provisional application No. 61/337,042, filed on Jan. 29, 2010.

(51) Int. Cl.
*E21B 47/00* (2012.01)
*E21B 47/09* (2012.01)
*E21B 47/10* (2012.01)
*G01V 1/137* (2006.01)

(52) U.S. Cl.
CPC ............ *E21B 47/101* (2013.01); *G01V 1/137* (2013.01); *G01V 2210/1212* (2013.01); *G01V 2210/1299* (2013.01)

(56) References Cited

U.S. PATENT DOCUMENTS

| | | | |
|---|---|---|---|
| 3,376,949 A | 4/1968 | Baker et al. | |
| 3,679,021 A | 7/1972 | Goldberg | |
| 3,979,724 A | 9/1976 | Silverman et al. | |
| 4,131,178 A | 12/1978 | Bouyoucos | |
| 4,408,676 A | 10/1983 | McCoy | |
| 4,637,463 A | 1/1987 | McCoy | |
| 4,674,067 A | 6/1987 | Zemanek, Jr. | |
| 4,793,178 A | 12/1988 | Ahem et al. | |
| 4,885,727 A * | 12/1989 | Auger | G01V 1/137 181/120 |
| 4,932,253 A | 6/1990 | McCoy | |
| 4,934,186 A | 6/1990 | McCoy | |
| 4,993,001 A | 2/1991 | Winbow et al. | |
| 5,117,399 A | 5/1992 | McCoy et al. | |
| 5,200,894 A | 4/1993 | McCoy et al. | |
| 5,285,388 A | 2/1994 | McCoy et al. | |
| 5,361,837 A * | 11/1994 | Winbow | E21B 33/14 166/249 |
| 5,406,482 A | 4/1995 | McCoy et al. | |
| 5,464,058 A | 11/1995 | McCoy et al. | |
| 5,472,049 A | 12/1995 | Chaffee et al. | |
| 5,517,854 A * | 5/1996 | Plumb | E21B 49/08 73/152.59 |
| 6,192,316 B1 | 2/2001 | Hornby | |
| 6,401,814 B1 * | 6/2002 | Owens | E21B 33/16 166/250.14 |
| 6,478,107 B1 * | 11/2002 | Birchak | G01V 1/133 181/104 |
| 7,397,388 B2 * | 7/2008 | Huang | E21B 47/182 166/373 |
| 7,819,188 B2 | 10/2010 | Auzerais et al. | |
| 8,047,285 B1 | 11/2011 | Smith | |
| 2002/0162660 A1 | 11/2002 | Depiak et al. | |
| 2004/0069530 A1 | 4/2004 | Prain et al. | |
| 2006/0072374 A1 * | 4/2006 | Kusko | E21B 47/187 367/83 |
| 2008/0080992 A1 * | 4/2008 | Cummins | F04B 15/02 417/404 |
| 2008/0236935 A1 | 10/2008 | Coates et al. | |
| 2008/0239872 A1 | 10/2008 | Miller et al. | |
| 2009/0006005 A1 | 1/2009 | Segal et al. | |
| 2009/0072180 A1 | 3/2009 | Johnson et al. | |
| 2009/0159272 A1 | 6/2009 | Auzerais et al. | |
| 2011/0267922 A1 * | 11/2011 | Shampine | E21B 47/0005 367/25 |
| 2012/0018150 A1 | 1/2012 | Shampine et al. | |
| 2012/0327742 A1 * | 12/2012 | Kusko | G01V 1/137 367/25 |

OTHER PUBLICATIONS

Echometer Company, "Gun-Microphone Assemblies for use with acoustic Liquid Level Instruments", 1995, 4 pages.
Raymond, "Hollow Glass Spheres under Pressure in the Ocean—Experiments Show Interesting Properties," Conf on Eng in the Ocean Environ and Mar Technol Soc, 11th Annu Meet, Proc; San Diego, CA, USA, Sep. 22-25, 1975, pp. 537-544.
Sercel, "Marine Sources, Ahead of the Curve", Brochure, Jan. 2011, pp. 2-29, France.
International Search Report and Written Opinion issued in PCT/US2016/066431 on Apr. 3, 2017; 11 pages.

* cited by examiner

TUBE WAVE GENERATION

CROSS REFERENCE TO RELATED APPLICATION(S)

This application is a continuation-in-part of copending application U.S. Ser. No. 13/015,985, filed Jan. 28, 2011, which claims priority to U.S. Ser. No. 61/337,042, filed Jan. 29, 2010, each of which is hereby incorporated by reference.

BACKGROUND

Tube waves, also called pressure waves or Stoneley waves, are plane pressure waves that propagate through tubular media, including annuli. These waves reflect from changes in the characteristic impedance of the medium. For example, the analysis of tube waves and/or their echoes can detect a fracture, bottom irregularity, or other features in a well. Several references describe the analysis of pressure wave reflections, such as US 2011/0267922, US 2012/0018150, U.S. 61/923,216, and U.S. Pat. No. 7,819,188.

A particular challenge in applying these techniques is a repeatable and reliable way to generate useful tube wave forms, e.g., with the desired rate of pressure change, frequency spectrum, peak power, total energy, repeatability, reliability, etc.

Pressure pulses are generated from water shock devices that rely on cavitation, e.g., Laake. A. et al., "A Generator for High Pressure Pulses in Liquids", *Journal of Sound and Vibration*, 131(2), pp. 295-304 (1989). These devices require an impedance transformer, and only work at low pressure to produce cavitation bubbles that collapse.

Also, explosives are used to implode glass spheres for ocean seismic work, as described in Raymond, S. "Hollow Glass Spheres under Pressure in the Ocean—Experiments Show Interesting Properties," *IEEE Conf on Eng in the Ocean Environ and Mar Technol Soc*, 11*th Annu Meet, Proc*; San Diego, Calif., USA, pp. 537-544 (22-25 Sep. 1975). Marine systems in general, and specifically such a glass sphere implosion, are not generally applicable to tube wave systems.

Various gas and water guns are available, including seismic gas guns miniaturized to fit into a wellbore as well as explosive guns firing blank shells, e.g., gas and water guns available under the trade designations ECHOMETER, NELGAR, LEUTERT, and so on. However, these guns are generally designed for use in compressible media, and suffer from the disadvantages of exhausting gas into the well in the case of gas guns, or require cavitation of the fluid for proper operation in the case of water guns.

Pressure pulses are also generated by opening and closing valves in a recirculating loop or in marine applications, e.g., U.S. Pat. Nos. 3,254,524, 3,376,949, but these are not designed for wellbore application. Similarly, negative pressure pulses are generated to locate cement wiper plugs by momentarily opening a vent valve, as in U.S. Pat. No. 6,401,814, but have the disadvantage that releasing fluid generates a waste stream. On the other hand, introducing exogenous fluid at a higher-than-system pressure into the system to generate a positive pressure pulse would require a fluid stream that is compatible with the pump and the system fluid, and would also entail a risk that the system can be over-pressured by the pump. One key wellsite hazard in pulse generation is the possibility that the wellhead may be closed while the pulse generator is operating.

The industry has an ongoing need for the development or improvement of tube wave generation methods and systems.

SUMMARY OF DISCLOSURE

In some embodiments according to the present disclosure, a reciprocating plunger is used to generate the tube wave in a system or method. In some embodiments, the tube waves are generated without adding or subtracting fluid from a pressurized tube wave system, for example, by producing pressure or vacuum in an isolated chamber system, which may or may not contain a gas-charged accumulator, and then releasing the chamber system from isolation and communicating the pressure or vacuum into the system.

In some embodiments according to the disclosure, a method to generate a tube wave in a tubular system comprises reciprocating a fluid end of a plunger in a chamber system to alternatingly increase and decrease a net volume of the chamber system; in response to the reciprocation of the fluid end of the plunger, cyclically drawing fluid from a tubular system into the chamber system, returning the fluid from the chamber system to the tubular system, and generating a tube wave; and guiding the tube wave through a two-way flow passage to the tubular system.

In some embodiments, the method further comprises cyclically opening and closing a firing valve to selectively establish and block fluid communication between the chamber system and the tubular system. In some embodiments, the method further comprises cyclically expanding and compressing a gas-charged accumulator in the chamber system. In some embodiments, the method further comprises rapidly cycling the plunger between net volume increase and decrease to propagate a cyclical tube wave through the two-way passage to the tubular system.

In some embodiments, the method further comprises acoustically pairing the two-way flow passage and a stub to form a spaced-pair resonator, and conditioning the guided tube wave in the spaced-pair resonator, e.g., to strengthen the tube wave or filter noise from the tube wave.

In some embodiments according to the disclosure, a method to generate a tube wave in a pressurized tubular system comprises (a) establishing fluid communication between a fluid-filled, pressurized tubular system and an enclosed chamber system containing the fluid to equalize the pressure, (b) isolating the enclosed chamber system from the tubular system, (c) changing the pressure of the fluid in the isolated, enclosed chamber system, (d) reestablishing fluid communication between the enclosed chamber system to equalize the pressure and generate a tube wave, and (e) guiding the tube wave to the tubular system.

In some embodiments according to the present disclosure, a tube wave generator-sensor system comprises a chamber system; a plunger slidable through a seal into the chamber system; a driver to reciprocate a fluid end of the plunger within the chamber system toward and away from the seal to generate a tube wave; a two-way flow passage from the chamber system to guide the tube wave into a tubular system; and a sensor to receive the tube wave signal, a response to the tube wave signal, or a combination thereof from the tubular system. In some embodiments, the system further comprises a firing valve to selectively open and close the two-way passage. In some embodiments, the system further comprises a gas accumulator in the chamber system.

Other aspects and advantages of the disclosure will be apparent from the following description and the appended claims.

GLOSSARY

Figure 1A:
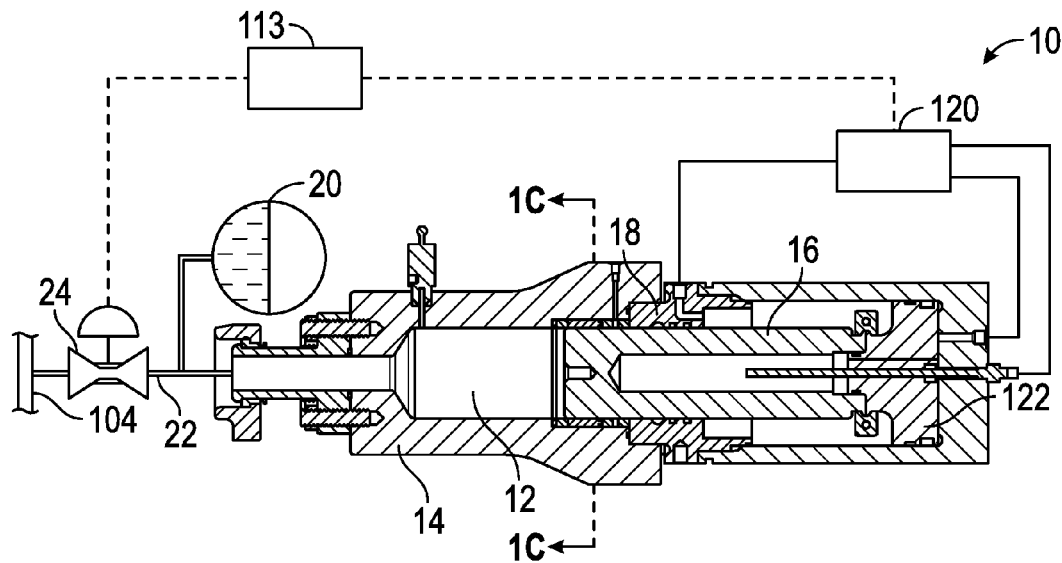
FIG. 1A is a side sectional view of a chamber and retracted plunger at the top of its stroke in accordance with some embodiments of the present disclosure.

"Above", "upper", "heel" and like terms in reference to a well, wellbore, tool, formation, refer to the relative direction or location near or going toward or on the surface side of the device, item, flow or other reference point, whereas "below", "lower", "toe" and like terms, refer to the relative direction or location near or going toward or on the bottom hole side of the device, item, flow or other reference point, regardless of the actual physical orientation of the well or wellbore, e.g., in vertical, horizontal, downwardly and/or upwardly sloped sections thereof.

As used herein, the words "about" or "approximately" are used to refer to numbers or values that may vary by up to 1%, 2%, or 5%.

Accumulator—one that accumulates, such as a device (as in a hydraulic system) in which a fluid is collected and especially in which it is kept under pressure as a means of storing energy. Compression or expansion of the accumulator herein refers to compression or expansion of the fluid in or charged to the accumulator.

Acoustic—relating to vibrations that travel through a medium.

The term "and/or" refers to both the inclusive "and" case and the exclusive "or" case, whereas the term "and or" refers to the inclusive "and" case only and such terms are used herein for brevity. For example, a component comprising "A and/or B" may comprise A alone, B alone, or both A and B; and a component comprising "A and or B" may comprise A alone, or both A and B.

Borehole or wellbore—the portion of the well extending from the Earth's surface formed by or as if by drilling, i.e., the wellbore itself, including the cased and open hole or uncased portions of the well.

Chamber—an enclosed space or cavity.

Chamber system—a chamber and a set of things or parts connected to the chamber forming a complex whole.

Charge—load or fill something (as a container or gun); the extent of the material with which something (as a container or gun) is loaded or filled.

Compressed—pressed together or into less volume or space; pressurized.

Controller—a thing that directs or regulates something.

Coupling—combining, linking or joining two things together.

Coupling, acoustic—the combining, linking or joining two things together to cooperate in an acoustic property or feature, such as sound transmission or resonance.

Cycle—a complete series or set (of events); to cause or allow a cycle to occur.

Cyclically—occurring as a complete series or set (of events).

Discharge—allow a liquid, gas, or other substance to flow out of confinement; the material that has flowed out of the confinement.

Diversion—the act of causing something to turn or flow in a different direction.

Diversion material—a substance or agent used to achieve diversion during stimulation or similar injection treatment; a chemical diverter.

Diversion pill—a relatively small quantity of a special treatment fluid blend used to direct or divert the flow of a treatment fluid.

Divert—to cause something to turn or flow in a different direction.

Diverter—anything used in a well to cause something to turn or flow in a different direction, e.g., a diversion material or mechanical device; a solid or fluid that may plug or fill, either partially or fully, a portion of a subterranean formation.

Drawing—extracting (an object or fluid) from a container, line, body, or receptacle.

Drive—the transmission of power to machinery.

Drive, cylinder—the transmission of power to machinery by supplying fluid (such as pneumatic or hydraulic) to act on a piston connected to the machinery by a rod.

Drive, direct acting—the transmission of power to machinery by mechanically connecting a device (as an engine, motor, or transmission) directly to the machinery.

Drive, double rod—the transmission of power to machinery by supplying fluid (such as pneumatic or hydraulic) to act on two sides of a piston that is connected to rods projecting through seals in both directions. The rods may be of the same or different diameter, but both move together due to the internal connection.

Drive, high power—a drive having sufficient power to

Driver—a wheel or other part in a mechanism that receives power directly and transmits motion to another part(s).

During—throughout the course of duration of (as a period of time); at a particular point in the course of.

Each—used to refer to every one of two or more things, regarded and identified separately.

Egress—go out of or leave (a place).

Element, flow resistance—any device or feature in a pipe or other fluid passage that increases the flow resistance, such as a restriction or narrowed section.

Embodiments—non-limiting tangible or visible forms of an idea or quality according to the present disclosure.

End—the furthest or most extreme part of something.

End, closed—an end that is not open; in pressure wave behavior, an end with low compliance producing a positive echo from a positive signal.

End, fluid—the end of a pump or component contacting or pumping a process fluid.

End, open—an end that allows access or passage through; an end that is not blocked; in pressure wave behavior, an end with high compliance producing a negative echo from a positive signal.

Equalize—to make the same in quantity, size, or degree throughout a place of group.

Expanded—being or having been enlarged, extended, or broadened.

Flow path—a passageway, conduit, porous material or the like through which fluid may pass.

Fluid—any of a liquid, gas, foam, mist, energized fluid, supercritical fluid, slurry, emulsion, etc.

Fluid communication—connection via a flow path.

Fluid hammer—a pressure surge or wave caused when a fluid in motion is suddenly forced to stop or change direction.

Formation—a body of rock that is sufficiently distinctive and continuous that it can be mapped, or more generally, the rock around a borehole.

Fracture—a crack or surface of breakage within rock.

Fracture zone—an interval having one or more fractures treated concurrently, e.g., fractures associated with a perforation cluster and/or treated in the same stage.

Frequency—the rate at which something occurs, e.g., in a wave.

Frequency, resonant—a frequency capable of exciting a resonance maximum in a given body or system; a natural frequency of vibration determined by the physical parameters of the vibrating object.

Generate—cause to arise or come about; produce energy.

Guide—direct or have an influence on the course of action of (something).

Hydraulic fracturing or "fracturing"—a stimulation treatment involving pumping a treatment fluid at high pressure into a well to cause a fracture to open.

Lateral—a branch of a well radiating from the main borehole.

Length—the measurement or extent of something from end to end; the greater of two or the greatest of three dimensions of a body.

Length, acoustic—the length of a resonant element corresponding to one-half wavelength of the resonant frequency; the physical length of the resonant element adjusted for end effects.

Line—a length of cord, rope, wire, or other material serving a particular purpose, such as pipe or tubing used to transmit flow, sound, light, etc. or cables or wires used to transmit electrical current.

Liner—a casing string that does not extend to the top of the wellbore, but instead is anchored or suspended from inside the bottom of the previous casing string.

Match—noun: things that correspond or are very similar in some essential respect; verb: correspond or cause to correspond in some essential respect. For purposes herein, acoustic properties such as acoustic length or resonant frequency are considered to be matched when the combination of corresponding waves results in an increase or decrease in the amplitude of the greater wave by at least 50% of the amplitude of the lesser wave.

Measure—to ascertain the value, number, quantity, extent, size, amount, degree, or other property of something by using an instrument or device.

Noise—fluctuations that accompany a signal that tend to obscure it.

Noise, pressure or pressure wave—pressure fluctuations that tend to obscure detection of a sound.

Passage

Passage, two-way flow—a passage accommodating fluid flow in either direction, e.g., a passage having no check valves to restrict flow to one direction only.

Perforation—the communication tunnel created from the casing or liner into the reservoir formation, through which fluids may flow, e.g., for stimulation and/or oil or gas production.

Phase or stage—a point, period, or step in a process or development.

Pipe—a tube of metal, plastic, or other material used to convey or contain water, gas, oil, or other fluid substances.

Plunger—a part that moves back and forth usually inside a tube or cylinder to push something out; a part of a device or mechanism that works with a plunging or thrusting movement.

Pressure condition, low—the state of the continuous physical force exerted on or against an object or fluid being less than a reference condition.

Pressure condition, high—the state of the continuous physical force exerted on or against an object or fluid being more than a reference condition.

Pressure signal emitter—a non-pumping device specially adapted to form a pressure wave in a wellbore, usually in communication with the high pressure side (outlet or discharge) of a fluid pump.

Progression—a movement or development toward a destination or a more advanced state, especially gradually or in stages; a succession; a series.

Propagate—to cause to move in some direction or through a medium.

Receive—to convert a signal to a file, sound, visual display or other perceptible medium.

Receiver—an electrical or computer apparatus that converts a signal to a file, sound, visual display or other perceptible medium.

Reciprocate—back and forth movement.

Refracturing or refrac—fracturing a portion of a previously fractured well after an initial period of production. The fractures from the earlier treatment are called "pre-existing fractures".

Reflector—an object or device that reflects radio waves, seismic vibrations, sound, or other waves Remote—distant or far away.

Reservoir—a subsurface body of rock having sufficient porosity and permeability to store and transmit fluids.

Resistance, flow—the forces preventing or retarding the passage of a fluid; the inverse of conductivity.

Resonance—the reinforcement or prolongation of sound by reflection, e.g., from a surface, or by the synchronous vibration of a neighboring object.

Respective—belonging or relating separately to each of two or more things.

Response—the reaction resulting from a stimulus.

Re-stimulation—stimulation treatment of any portion of a well, including any lateral, which has previously been stimulated.

Seal—a device or material that is used to join to things together so as to prevent anything from passing between them.

Sending—cause (a message or computer file) to be transmitted electronically.

Sensing—automatically detecting or measuring something.

Sensor—a device that detects or measures a physical property and records, indicates or otherwise responds to it.

Shut in—closing a wellbore at the surface, e.g., at or near the Christmas tree, blowout preventer stack As used herein, "sign" refers to the mathematical character of a number or the direction of a wave, viz. whether positive (greater than zero or the same direction as a reference) or negative (less than zero or a different direction with respect to a reference).

Signal—an acoustic, physical, chemical, electrical, electromagnetic, or other impulse transmitted or received.

Simulate—to create a representation or model of something, e.g., a physical system or particular situation.

Slidable—capable of moving along a usually smooth surface while maintaining contact with it.

Stimulation—treatment of a well to enhance production of oil or gas, e.g., fracturing, acidizing, and so on.

Suddenly—occurring or done quickly.

Surface—the surface of the Earth.

Treatment—the act of applying a process or substance to something to give it particular properties.

Treatment fluid—a fluid designed and prepared to resolve a specific wellbore or reservoir condition.

Tube wave—a periodic pressure disturbance in which alternating compression and rarefaction are propagated through or on the surface of a medium without translation of the material; also known as a pressure wave or Stonely wave.

Tubular system—a set of connected things or parts, including at least one long, round, and hollow member like a tube, and forming a complex whole.

Vacuum—a pressure below ambient or atmospheric pressure.

Valve—a device for controlling the passage of fluid through a pipe or duct.

Valve, firing—a valve used to initiate discharge of (a material from a device).

Volume—the amount of space that a substance or object occupies, or that is enclosed within a container.

Volume, net—the amount of space that is enclosed within a container plus any extensions thereof less any displacement thereof.

Wave, pressure—the pattern in which pressure fluctuations spread; sound wave.

Waveguide—a metal tube or other device confining and conveying acoustic or electromagnetic waves.

Well—a deep hole or shaft sunk into the earth, e.g., to obtain water, oil, gas, or brine.

Wireline—a well operation or system employing single-strand or multi-strand wire or cable to lower and raise downhole tools; the wire or cable used in such operations.

DETAILED DESCRIPTION

In the following description, numerous details are set forth to provide an understanding of the present disclosure. However, it may be understood by those skilled in the art that the methods of the present disclosure may be practiced without these details and that numerous variations or modifications from the described embodiments may be possible. At the outset, it should be noted that in the development of any such actual embodiment, numerous implementation—specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

According to some embodiments of the present disclosure, a plunger, which may be, for example, a hydraulically driven frac pump plunger with standard frac pump packings, is configured so that the plunger can be pushed into a tubular system and pulled out in a reciprocating manner, to generate a pressure wave. In some embodiments, this system generates pressure pulses without introducing exogenous fluid into the system, or releasing any fluid from the system, thereby avoiding the problems with such pulse generator systems noted above, i.e., generation of a waste stream, incompatible fluids, overpressuring the tubular system, etc.

In some embodiments, the disclosure herein is applicable to methods and systems for guiding a pressure wave or series of pressure waves into a fluid filled tubular system. As one example of a fluid-filled tubular system to which the present disclosure is generally applicable, the following discussion refers to a fluid-filled wellbore in which tube waves may be used for detection or analysis of one or more wellbore features, such as a plug or fracture zone in a wellbore filled with gas, liquid, foam, energized fluid, mist, slurry, or the like.

According to some embodiments herein, the tubular system generally has a volume that is several orders of magnitude larger, e.g., at least a thousand times larger, than the plunger displacement, so that the plunger arrangement cannot overpressure the tubular system since it will at most either oscillate the system pressure up to and below the starting pressure, or boost the system pressure only very slightly with the initial in-stroke. Further, in some embodiments, the pulse generation system can limit the in-stroke pressure using either or both of the hydraulic or other drive design, as well as the control system. In any embodiments herein, the plunger can operate in a closed system, e.g., a closed chamber system, to increase or decrease the pressure in the closed system.

In some embodiments, the pulse signal generator described herein is capable of operation in several different cycling modes to generate both positive and negative pulses, without any hardware changes, viz. without replacing mechanical or electromechanical components of the plunger system.

In some embodiments according to the disclosure, a method to generate a tube wave in a tubular system comprises reciprocating the fluid end of a plunger in a chamber system to alternatingly increase and decrease a net volume of the chamber system in response to the reciprocation of the fluid end of the plunger, e.g., by respectively reducing the plunger displacement on partial retraction from, or increasing plunger displacement on insertion or advancement of the plunger into the chamber system. In cyclical operation, the plunger system in some embodiments draws fluid from the tubular system into the chamber system, returns the fluid from the chamber system to the tubular system, and generates a tube wave, e.g., at the top and/or bottom of the plunger stroke. In some embodiments, the tube wave is guided into the tubular system, e.g., through a flow passage to the tubular system.

In some embodiments, the flow passage is a two-way passage through which the tubular system fluid, for example, may generally flow freely in either direction through the open passage between the tubular system and the chamber system, e.g., when any valve in the passageway is opened. If a firing valve is present in the two-way passage, for example, in some embodiments it is a bidirectional valve that allows selectively opening the valve to allow fluid passage, or closing the valve to block fluid passage, regardless of which end has the higher pressure.

In some embodiments, the method of generating tube waves further comprises cyclically opening and closing a firing valve to selectively establish and block fluid communication between the chamber system and the tubular system. In some embodiments, the firing valve referred to throughout this disclosure is a fast-acting valve, and/or a valve configured to open or close in period of time less than about 500 milliseconds, or less than about 200 milliseconds, or less than about 120 milliseconds, or less than about 100 milliseconds, and/or a regenerative valve such as a poppet valve, all as described in U.S. App. Pub. No. 2011/0267922, incorporated by reference herein.

In some embodiments, in a first mode of operation, the method further comprises opening the firing valve during decrease of the net volume to displace or otherwise return the fluid from the chamber system to the tubular system, e.g., in a reset phase; closing the firing valve during increase of the net volume, such as by retracting the plunger, to create a vacuum or low pressure condition in the chamber system, relative to the tubular system, e.g., in an arming phase; and opening the firing valve to equalize the pressure in the chamber system, such as by fluid rapidly entering the chamber system, and guide a negative tube wave to the tubular system. In some embodiments, the vacuum volume in this mode of operation may provide sufficient energy storage to generate the tube wave, so that an accumulator is not needed and thus not present. In some embodiments, the low pressure condition referred to in this disclosure is at least 345 kPa (50 psi) below the pressure of the tubular system; or at least 690 kPa (100 psi) below the pressure of the tubular system; or at least 1.38 MPa (200 psi) below the pressure of the tubular system; or at least 3.45 MPa (500 psi) below the pressure of the tubular system; or from 345 kPa (50 psi) or 690 kPa (100 psi) up to 3.45 MPa (500 psi) below the wellbore pressure; or a pressure that is at least 1% less than wellbore pressure; or from 2% up to 20% less than the wellbore pressure (80-98% of wellbore pressure); or from 30% to 100% less than the wellbore pressure (0-70% of the wellbore pressure).

The sudden initiation of fluid flow when the valve is opened, and/or sudden termination of fluid flow when the pressure in the chamber system is equalized, can, for example, result in fluid hammers that initiate pressure waves. The pressure wave guided in this exemplary mode of operation upon initiation of fluid flow when the firing valve is opened, is generally regarded as negative since the flow direction of the fluid out of the tubular system and into the chamber system, thereby propagating a lower-than-system pressure wave. The use of vacuum in some embodiments has the advantage of inhibiting oscillations as a gas bubble compresses and expands in a periodic manner, also called a "bubble pulse". The strength or amplitude of the negative pressure wave generated in this manner can be adjusted in some embodiments by varying the displacement in either of the reset or arming phases. For example, limiting the length of plunger insertion travel in the reset phase (and/or allowing some retraction before closing the firing valve) to reduce the magnitude of the pulse may contribute to imposing the pulse generating shock on the mechanical parts, whereas limiting the length of plunger retraction travel during the arming stage may contribute to imposing the pulse generating shock on the hydraulic system. The strength of negative pulses increases with the wellbore pressure, and negative pulses also involve less risk of over-pressurizing the tubular system.

In some embodiments, in a fourth mode of operation, the method of generating tube waves further comprises opening the firing valve during increase of the net volume, e.g., retraction of the plunger from the chamber system in a reset phase, to draw fluid from the tubular system into the chamber system; closing the firing valve during decrease of the net volume such as by advancing the plunger, to create a high pressure condition in the chamber system relative to the tubular system, e.g., in an arming phase; and opening the firing valve to equalize the pressure in the chamber system and guide a positive tube wave to the tubular system, e.g., in a firing or activation phase. The strength of the positive pulse in some embodiments can be limited by low compressibility of the system fluid and/or high tensile modulus of the materials of construction of the chamber housing, for example, and in some cases where the system fluid is aqueous or has a compressibility similar to water, severely limited, but greater than zero. In some embodiments the high pressure condition referred to throughout this disclosure is at least 345 kPa (50 psi) above the pressure of the tubular system; or at least 690 kPa (100 psi) above the pressure of the tubular system; or at least 1.38 MPa (200 psi) above the pressure of the tubular system; or at least 3.45 MPa (500 psi) above the pressure of the tubular system. There is no upper pressure limit, which may be up to the design pressure of the chamber system. For example, the high pressure condition may be from least 20% above the wellbore pressure up to 2, 5, or even 10 times the wellbore pressure or more, e.g., 105 MPa (15,000 psi) for a wellbore pressure of 21 MPa (3000 psi) or 10.5 MPa (1500 psi).

In some embodiments, the method further comprises, e.g., cyclically, expanding and/or compressing an accumulator in the chamber system, which may, for example, be charged with high pressure gas or another compressible fluid. The charge pressure generally depends on the manner in which the accumulator will be used and the pressure in the tubular system. In some embodiments, in a second mode of operation, the method further comprises opening the firing valve during increase of the net volume to draw fluid from the tubular system into the chamber system in a reset phase, closing the firing valve during decrease of the net volume to compress the accumulator, e.g., to a desired pressure, in an arming phase, opening the firing valve to expand the accumulator and return fluid from the chamber system to the tubular system in a firing or activation phase, and guiding a positive tube wave to the tubular system.

In some embodiments, in a third mode of operation, the method further comprises opening the firing valve during reduction of the net volume to return fluid from the chamber system to the tubular system in a reset phase, closing the firing valve during increase of the net volume to create vacuum or a low pressure condition in the chamber system and expand the accumulator in the arming phase, and opening the firing valve to draw fluid into the chamber system and compress the accumulator in an activation or firing phase, and guiding a negative tube wave to the tubular system.

In some embodiments, in a fifth mode of operation, the method further comprises rapidly cycling the plunger between net volume increase and decrease to propagate a cyclical tube wave through the two-way passage to the tubular system. In some embodiments, no valve is needed in the two-way passage, or if a firing valve is present it is left in the open state. In some embodiments, the plunger is operated rapidly to directly produce pressure waves, e.g., in any desired or even arbitrary manner, but may require more power for the hydraulic or other drive relative to the first though fourth modes of operation.

In some embodiments, the method further comprises acoustically pairing the two-way flow passage and a stub together to form a spaced-pair resonator, and conditioning the guided tube wave in the spaced-pair resonator, e.g., to strengthen the tube wave or filter noise from the tube wave. In some embodiments, the method further comprises matching the resonance of the spaced-pair resonator to the guided tube wave and strengthening the tube wave in the tubular system. In some embodiments, the method further comprises matching the resonance of the spaced-pair resonator to noise in the guided tube wave and filtering the noise from the tube wave.

In some embodiments according to the disclosure, a method to generate a tube wave in a pressurized tubular system comprises (a) establishing fluid communication between a fluid-filled, pressurized tubular system and an enclosed chamber system containing the fluid to equalize the pressure, (b) isolating the enclosed chamber system from the tubular system, e.g., by closing a firing valve, (c) changing the pressure of the fluid in the isolated, enclosed chamber system, e.g., by moving a plunger in the chamber system to change the displacement, (d) reestablishing fluid communication between the enclosed chamber system to equalize the pressure and generate a tube wave, e.g., by opening the firing valve, and (e) guiding the tube wave to the tubular system.

In some embodiments, the method further comprises opening and closing a firing valve to selectively isolate the enclosed chamber system in (b) and reestablish the fluid communication in (d), respectively. In some embodiments, the method further comprises sliding a plunger through a sealed port into the enclosed chamber system to an armed position in (c) and reciprocating the plunger to a reset position following (d).

In some embodiments, the pressure in the isolated, enclosed chamber system is increased in (c), and a positive tube wave is generated in (d). In some embodiments, the method further comprises compressing an accumulator in the chamber system in (c) and expanding and/or relaxing the accumulator in (d).

In some embodiments, the pressure in the isolated, enclosed chamber system is decreased in (c), and a negative tube wave is generated in (d). In some embodiments, the method further comprises expanding an accumulator in the chamber system in (c) and compressing and/or relaxing the accumulator in (d).

In some embodiments according to the present disclosure, a tube wave generator-sensor system comprises a chamber system; a plunger slidable through a seal into the chamber system; a driver to reciprocate a fluid end of the plunger within the chamber system toward and away from the seal to generate a tube wave; a two-way flow passage from the chamber system to guide the tube wave into a tubular system; and a sensor to receive the tube wave signal, a response to the tube wave signal, or a combination thereof from the tubular system.

In some embodiments, the system further comprises a firing valve to selectively open and close the two-way passage. In some embodiments, the system further comprises a controller to cycle the system through pressure wave generation arming, firing (or activation), and reset phases. In some embodiments, the reset phase comprises opening the firing valve during insertion of the plunger to displace fluid from the chamber system into the tubular system, the arming phase comprises closing the firing valve during retraction of the plunger to create a low pressure condition in the chamber system, and the firing phase comprises opening the firing valve to allow fluid to enter the chamber system and generate a negative tube wave in the tubular system. In some embodiments, the reset phase comprises opening the firing valve during retraction of the plunger to draw fluid from the tubular system into the chamber system, the arming phase comprises closing the firing valve during insertion of the plunger to create a high pressure condition in the chamber system, and the firing phase comprises opening the firing valve to allow fluid egress from the chamber system and generate a positive tube wave in the tubular system.

In some embodiments, the system further comprises a firing valve to selectively open and close the two-way passage, and a gas accumulator in the chamber system. In some embodiments, the system further comprises a controller to cycle the system through tube wave generation arming, firing (or activation), and reset phases. In some embodiments, the reset phase comprises opening the firing valve during retraction of the plunger to draw fluid from the tubular system into the chamber system, the arming phase comprises closing the firing valve during insertion of the plunger to create a high pressure condition in the accumulator, and the firing phase comprises opening the firing valve to allow fluid egress from the chamber system, expansion of the accumulator, and generation of a positive tube wave in the tubular system. In some embodiments, the reset phase comprises opening the firing valve during insertion of the plunger to displace fluid from the chamber system into the tubular system, the arming phase comprises closing the firing valve during retraction of the plunger to create a low pressure condition in the accumulator, and the firing phase comprises opening the firing valve to allow fluid to enter the chamber system, compress the accumulator, and generate a negative tube wave in the tubular system.

In some embodiments, the system further comprises a high power drive, e.g., hydraulic, to rapidly cycle the plunger between insertion and retraction to propagate a cyclical tube wave through the two-way passage into the tubular system. As used herein, rapidly cycling refers to a frequency, for example, of at least about 0.1 Hz, or at least about 1 Hz, or at least about 10 Hz, and a high power is any drive having sufficient power to rapidly cycle the plunger. In some embodiments, the drive comprises a direct action hydraulic drive, a cylinder drive, or a double rod drive.

In some embodiments, the system further comprises a lateral branch connected to the tubular system opposite the two-way flow passage to acoustically pair the lateral branch with the two-way flow passage and together form a spaced-pair pressure wave resonator having a resonant frequency to strengthen the tube wave.

In some embodiments, the system further comprises a lateral branch connected to the tubular system opposite the two-way flow passage to acoustically pair the lateral branch with the two-way flow passage and together form a spaced-pair pressure wave resonator having a resonant frequency to filter a noise portion of the tube wave having the resonant frequency.

Figure 1B:
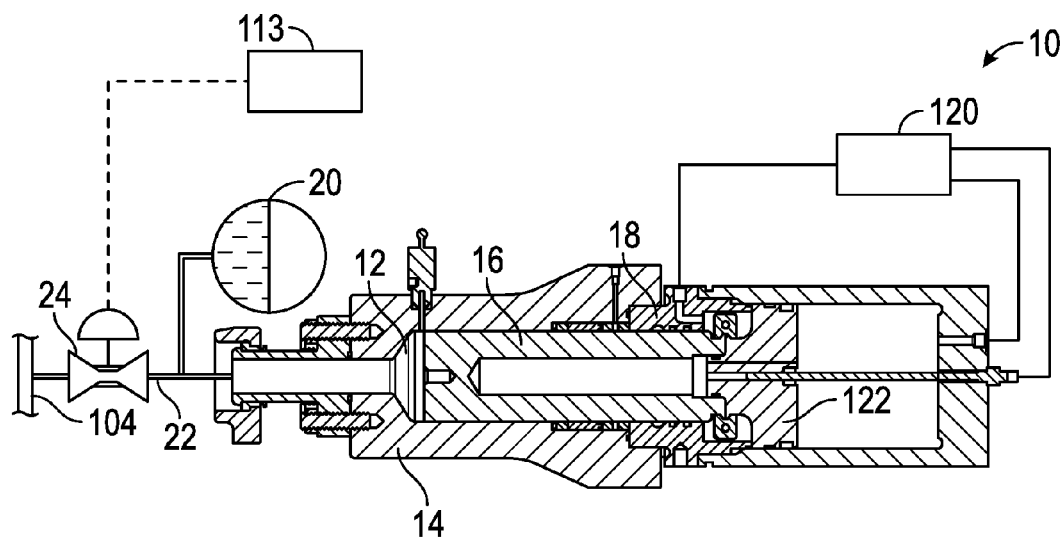
FIG. 1B is a side sectional view of the chamber/plunger of FIG. 1A with the plunger at the bottom of its stroke in accordance with some embodiments of the present disclosure.
Figure 1C:
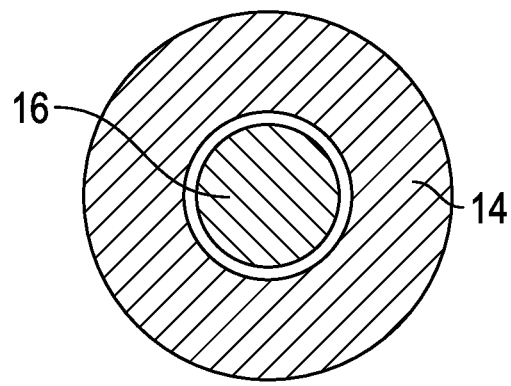
FIG. 1C is a cross sectional view of the plunger and chamber of FIG. 1A as seen along the view lines 1C-1C.
Figure 1D:
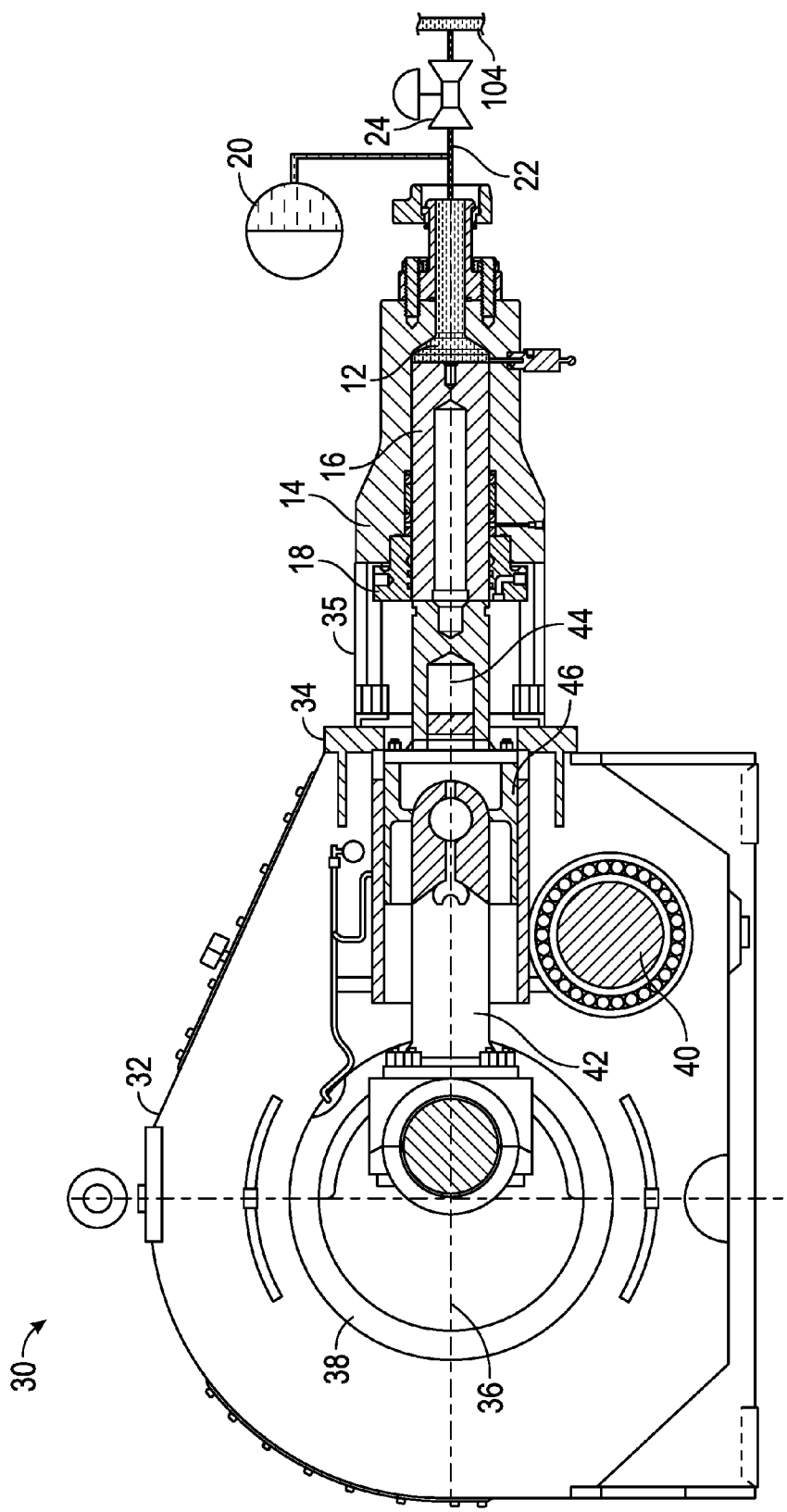
FIG. 1D shows a side view of direct drive plunger arrangement, partly in section, in accordance with some embodiments of the present disclosure.

With reference to the drawings wherein like numbers refer to like parts, FIGS. 1A-1C show a tube wave signal generator 10 according to some embodiments of the present disclosure. The signal generator 10 has a chamber 12, defined by housing 14, and a plunger 16 is shown in FIG. 1A retracted through the seal 18 at the top of its stroke. FIG. 1B shows the signal generator 10 with the plunger 16 moved forward into the chamber 12 at the bottom of its stroke. A gas-filled accumulator 20 is optionally present in the chamber 12. A flow passage 22 is in fluid communication with the chamber 12 to allow the ingress and/or egress of fluid FIG. 1D schematically shows a direct drive 30 for the plunger 16. The direct drive generally has a frame 32 and a nose plate 34 connected via tie rods 35 to the housing 14. A crankshaft 36 is rotated on main bearings 38 to transfer power from input shaft 40 to reciprocate connecting rod 42 and pony rod 44 via crosshead 46.

Figure 1E:
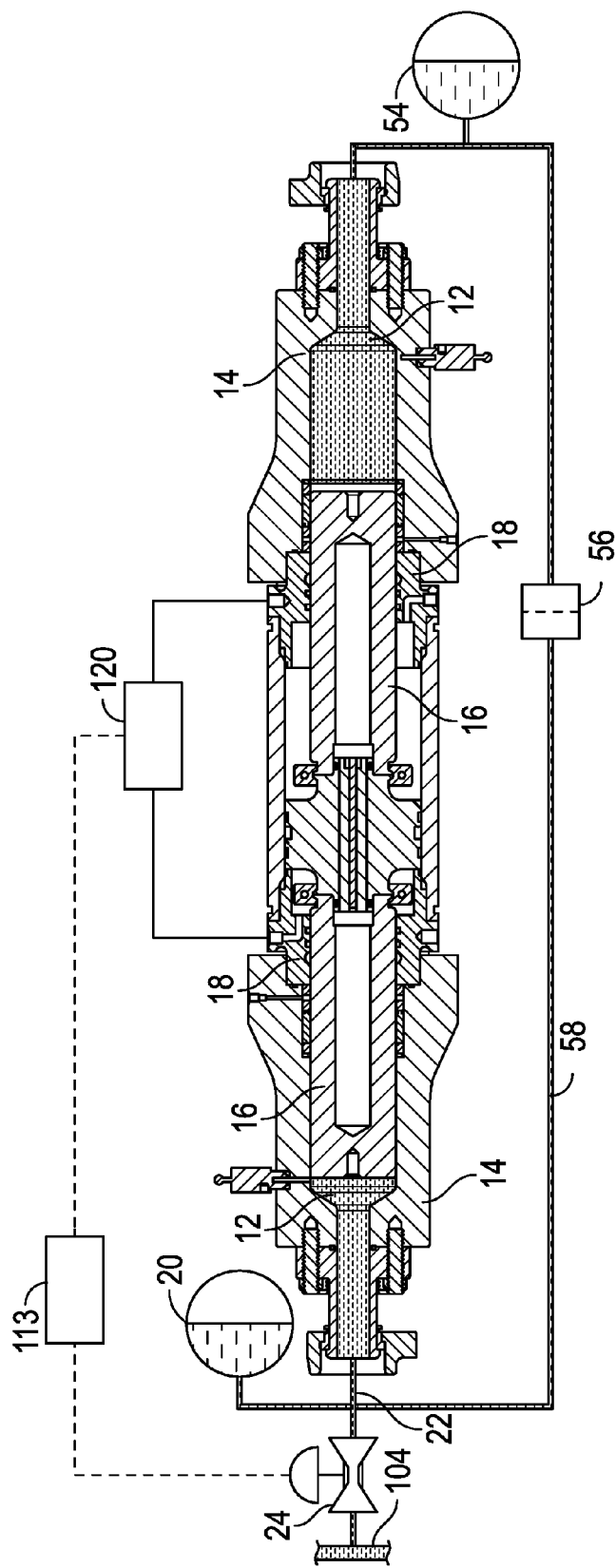
FIG. 1E shows a side view of the direct drive plunger arrangement of FIG. 1D as seen along the view lines 1E-1E.

FIG. 1E shows a double rod drive 50 for the plungers 16, 16' which are connected via rod 52. The chamber 12' is filled and/or has a decreased pressure when chamber 12 is emptied or has an increased pressure, and vice versa. In the embodiment shown, the chamber 12' is not directly connected to the treating line 104 or wellbore 106 (FIG. 2), but may be connected to an accumulator 54 and/or orifice 56 in bleed line 58 to balance the load on rod 52 and facilitate resetting after firing the valve 24, re-arming after closing the valve 24, and/or tuning the pressure wave that is generated. The orifice 56 in some embodiments is sized such that the pressure on the accumulator 54 does not fluctuate significantly during a pulse generation cycle. In some embodiments the orifice may be a valve that is normally closed and is actuated whenever it is desired to equalize the pressure on accumulator 54 with the treating line 104 (well pressure), e.g., when the drive is placed in service, after the well pressure fluctuates, and/or prior to a pulse generation cycle.

Figure 2:
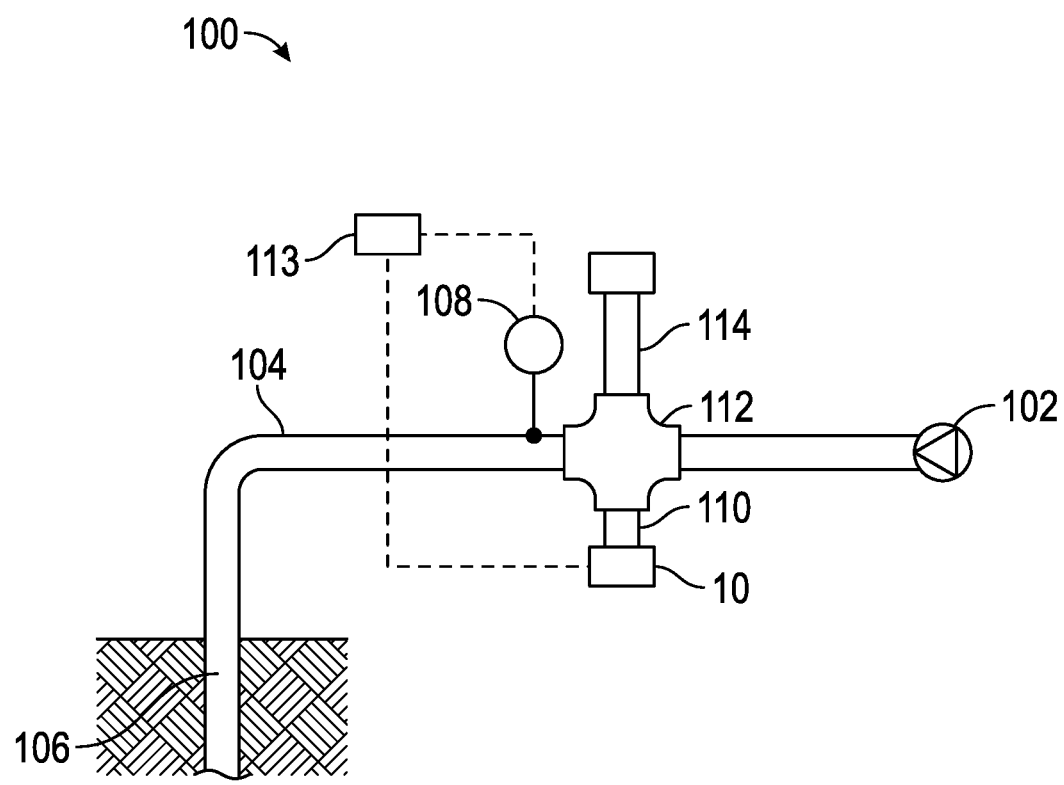
FIG. 2 is a schematic diagram of a tube wave system with a signal generator in accordance with embodiments of the present disclosure.

FIG. 2 shows a tubular system 100 having one or more pumps 102 delivering fluids to a main treating line 104 supplying the wellbore 106, with a pressure sensor 108 and the signal source 10 (see FIGS. 1A-1E) coupled to the main treating line 104 by a flow passage 110, which may be a relatively short piece of pipe connected to the pipe joint 112. In some embodiments, a controller 113 controls the operation of the wave generator 10 and/or receives pressure readings or data derived from the sensor 108. In the embodiments of FIG. 2, a lateral branch 114, i.e., stub, is also connected to the joint 112, e.g., opposite and or coaxially with the pipe 110, for example such that the pipe 110 and branch 114 form a paired acoustic element. In some embodiments, the length of the pipe 110 and the branch 114 may be chosen such that the output of the signal source 10 is conditioned as desired, e.g., amplified at the resonant frequency, or filtered to remove an undesired frequency.

Figure 3A:
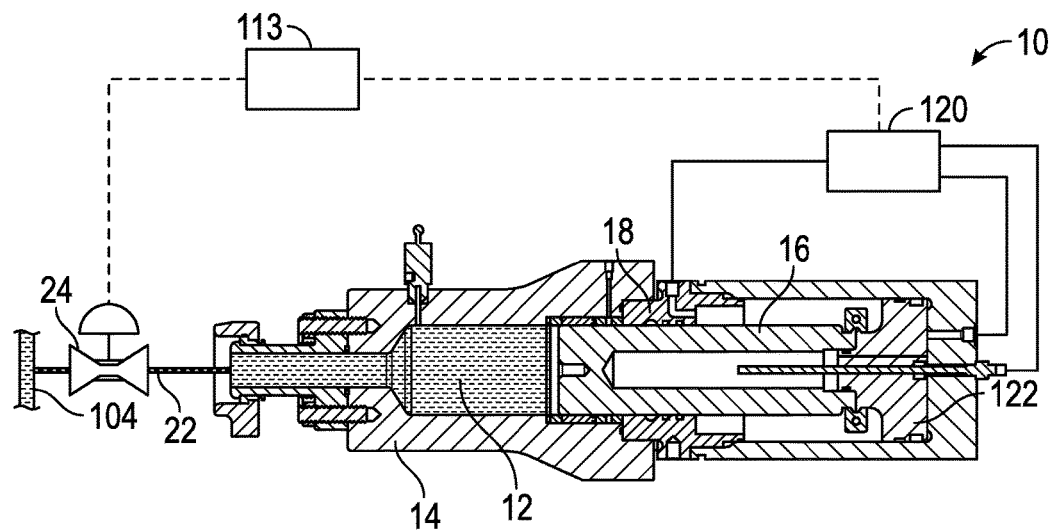
FIG. 3A is a schematic diagram of a tube wave generator at the beginning or end of a cycle with the plunger at the top of its stroke and the firing valve open in accordance with embodiments of the present disclosure.
Figure 3B:
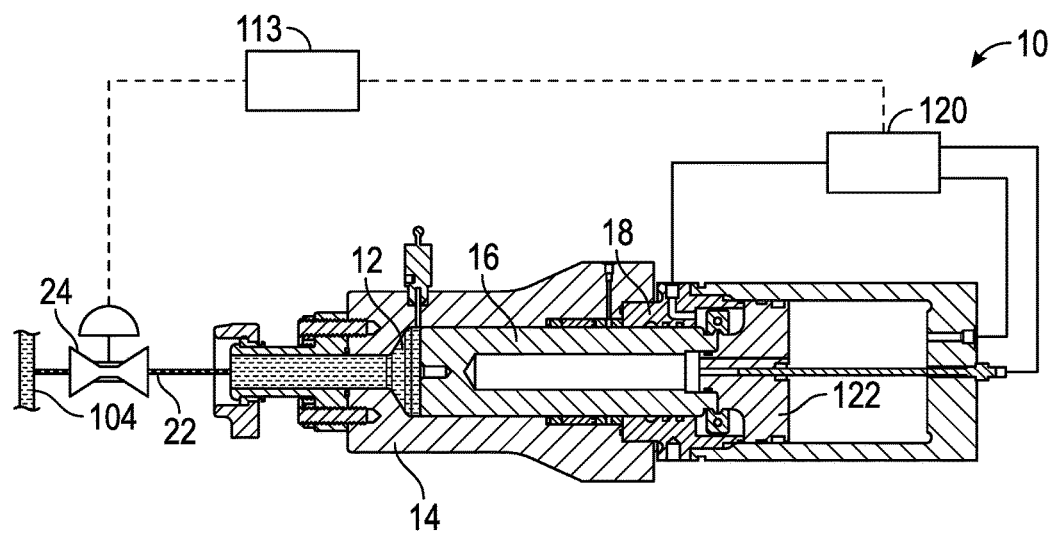
FIG. 3B is a schematic diagram of the tube wave generator of FIG. 3A shown in the reset position with the plunger at the bottom of its stroke and the firing valve open in accordance with embodiments of the present disclosure.
Figure 3C:
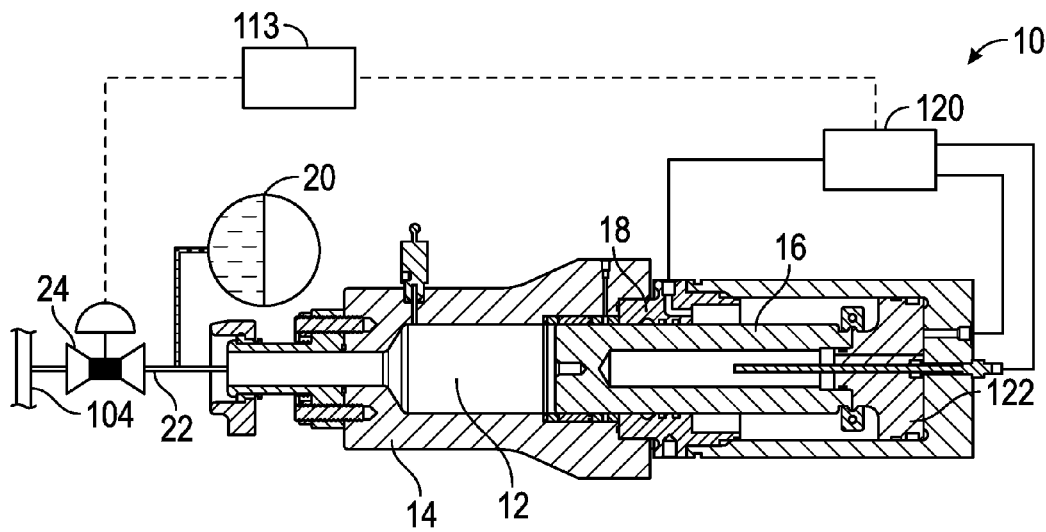
FIG. 3C is a schematic diagram of the tube wave generator of FIG. 3C shown in the armed position with the plunger at the top of its stroke and the firing valve closed in accordance with embodiments of the present disclosure.

FIGS. 3A-3C show an operational cycle of the tube wave generator 10 (FIGS. 1A-1X) to produce a negative pressure wave without an accumulator. The controller 113 coordinates operation of the valve 24 and the drive system, which in this example is a hydraulic unit 120 supplying or removing hydraulic fluid on either side of the cylinder drive 122 that is connected to the plunger 16, as required to advance and retract the cylinder drive 122 to slide plunger 16 in and out of the chamber 12.

In FIG. 3A, at the beginning of the cycle and/or at the end of a previous cycle, the plunger 16 is at the top of its stroke, the firing valve 24 is open, and the chamber 12 contains fluid from the tubular system (see FIG. 2) and at the same pressure. In FIG. 3B, the plunger 16 is reset to the bottom of its stroke and the firing valve 24 is open to exhaust fluid from the chamber 12. Then, in FIG. 3C the firing valve 24 is closed and the system is armed by retracting the plunger 16, creating a vacuum or other low pressure condition in the chamber 12. For example, the wave is then generated by rapidly opening the firing valve 24 (see FIG. 3A) to allow fluid to enter the chamber 12 and equalize the pressure. The generator 10 is then ready to begin another cycle by repeating the above steps.

The firing valve 24 can be a plug valve (sometimes referred to as a hammer valve in the oilfield due to the end connections that are assembled using a hammer), a ball valve, or any other type of valve that is capable of opening/closing at a relatively fast speed. In some cases, the firing valve 24 is a rotary valve that operates on quarter turns, although other variations can be employed as well. In this patent application, when the terms "fast", "quick", and "rapid" are used in connection with the description of the firing valve 24, they generally mean that the firing valve 24 is capable of opening or closing in a time that is within an order of magnitude of the firing duration of the tube wave. In some embodiments, the firing valve 24 is capable of opening or closing in a time that is less than the firing duration of the tube wave. In some embodiments, the firing valve 24 is capable of opening or closing in a time that is between about 1-3 times (inclusive) the firing duration of the tube wave.

In general, the fast operating valve 24 of the current application is capable of opening or closing in less than or equal to approximately 500 milliseconds. In some embodiments, the firing valve 24 is capable of opening or closing in less than approximately 50 milliseconds, less than approximately 75 milliseconds, less than approximately 100 milliseconds, less than approximately 150 milliseconds, less than approximately 175 milliseconds, less than approximately 200 milliseconds, less than approximately 250 milliseconds, less than approximately 300 milliseconds, less than approximately 350 milliseconds, less than approximately 400 milliseconds, less than approximately 450 milliseconds, or less than approximately 500 milliseconds.

The firing valve 24 can be pneumatically or hydraulically operated. An actuator incorporating a spring that acts during the opening or closing cycle of the firing valve 24 can be used to increase the opening or closing speed of the firing valve 24. Vane actuators may be selected over piston actuators for this application. In general, the higher the chamber pressure, the more torque that is required to open the firing valve 24 due to the friction in the seals. However, increased friction typically means slower opening/closing of the firing valve 24. Therefore, an operator often may carefully balance the benefit of operating under higher chamber pressure (hence higher-energized tube waves) and the drawback associated with the increased friction (hence the slower opening/closing of the valve). A proper balance can be struck to achieve an overall satisfactory result.

In one specific embodiment of the application, a standard 2×1 size 1502 hammer valve such as the FMC's ULT 150 plug valve part number P516108 can be suitably used as the firing valve 24. Further, a spring can be used to assist the opening of the valve. This valve has a cylindrical plug with a round cross drill for the fluid passage that is 0.75" bore. The two ports can taper from the full bore of the end connections (1.75") down to match the bore of the plug. Two seal sections can be disposed, one on each port such that pressure applied to one port pushes the plug into the opposite seal section, effecting a seal. Each seal section can have a central hole matching the plug bore. When the plug is rotated such that the plug bore, the two seal section bores, and the two valve port bores are lined up, it is in the open position and provides a flow path with at least 0.75" inside diameter through the entire valve. When the plug is rotated 90 degrees this path is closed.

Other specific examples of valves suitably employed as the firing valve 24 are described in the aforementioned U.S. App. Pub. No. 2011/0267922 incorporated by reference above.

Figure 4A:
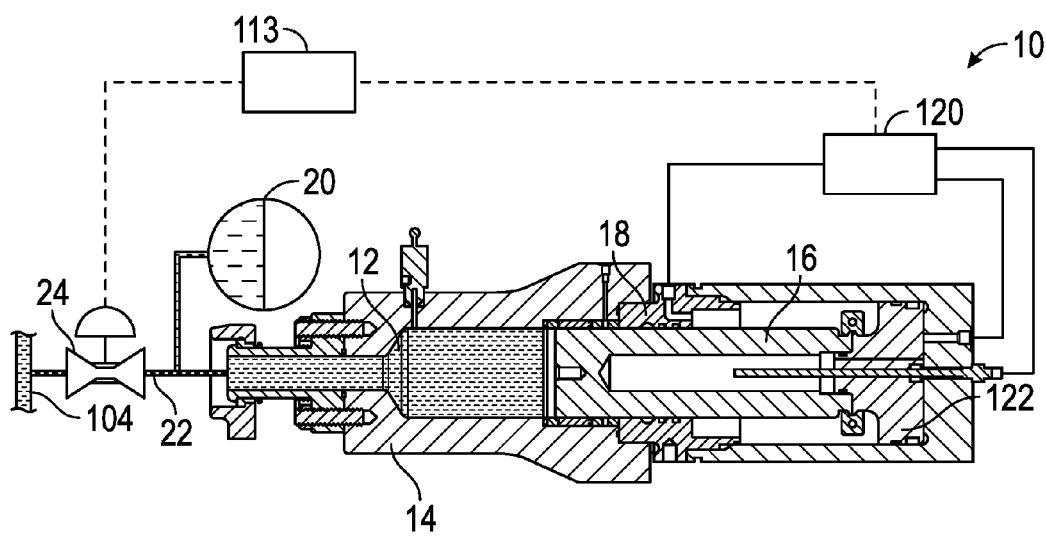
FIG. 4A is a schematic diagram of a tube wave generator in a reset cycle with the valve open, the accumulator relaxed or expanded in a neutral position, and the plunger retracted in accordance with embodiments of the present disclosure.
Figure 4B:
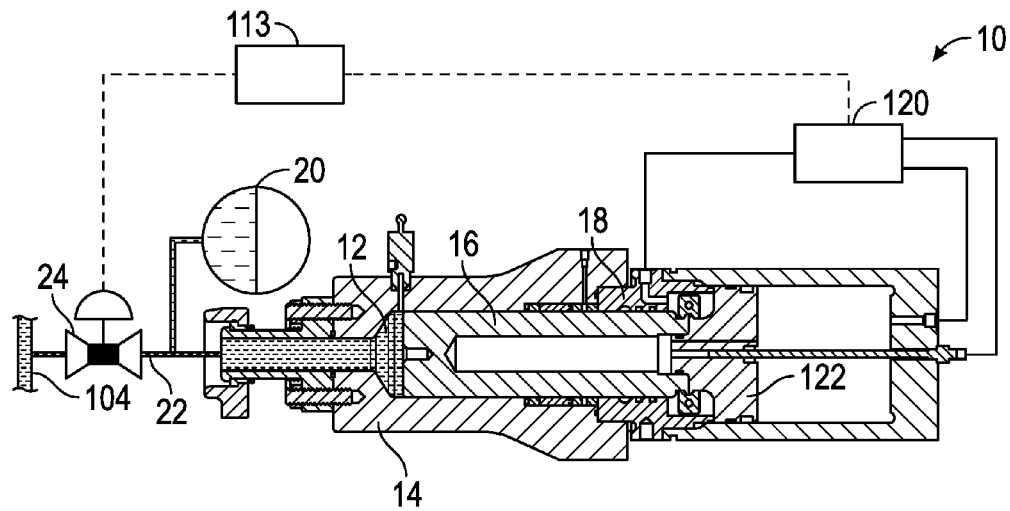
FIG. 4B is a schematic diagram of the tube wave generator of FIG. 4A, shown in an armed position with the valve closed, the accumulator compressed, and the plunger at the bottom of the stroke in accordance with embodiments of the present disclosure.
Figure 4C:
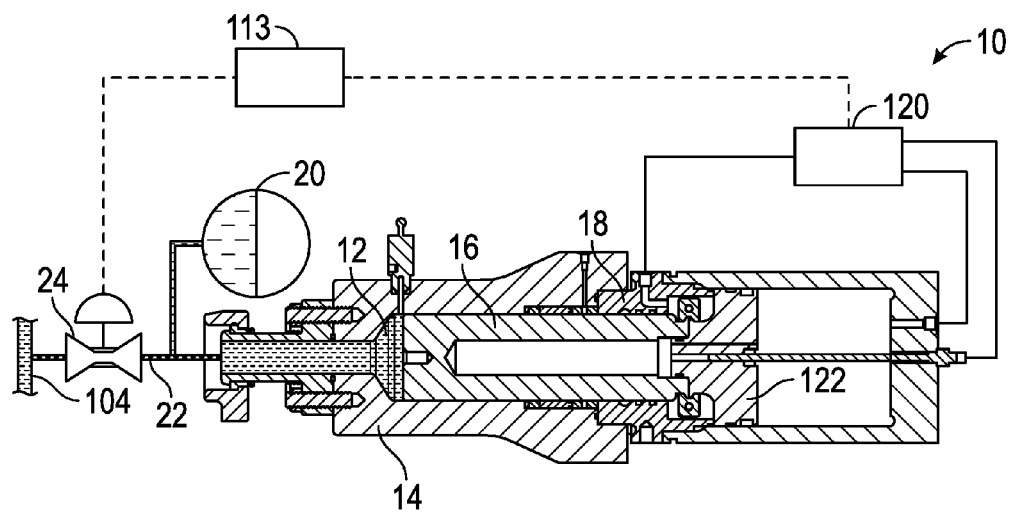
FIG. 4C is a schematic diagram of the tube wave generator of FIG. 4B, shown at the end or start of a cycle following activation with the valve opened, the accumulator relaxed or expanded in a neutral position, and the plunger still at the bottom of the stroke in accordance with embodiments of the present disclosure.

FIGS. 4A-4C show an operational cycle of the tube wave generator 10 (FIGS. 1A-1X) to produce a positive pressure wave using the accumulator 20. In FIG. 4A, following reset after the end of a previous cycle, the plunger 16 is at the top of its stroke, the firing valve 24 is open, the accumulator 20 is relaxed or expanded relative to the armed position (FIG. 4B), and the chamber 12 contains fluid from the tubular system 100 (see FIG. 2) and at the same pressure. In FIG. 4B, the firing valve 24 has been closed and the plunger 16 moved to the bottom of its stroke to pressurize the chamber 12 and compress the accumulator 20. Then, in FIG. 4C the firing valve 24 is opened to allow fluid to exit the chamber 12 and generate a tube wave, the accumulator 20 to expand, and the pressure to equalize with the tubular system 100. The wave is generated by rapidly opening the firing valve 24 to allow fluid to enter the chamber 12 and equalize the pressure. The generator 10 is then ready to begin another cycle by repeating the reset, arm, and firing steps.

Figure 5A:
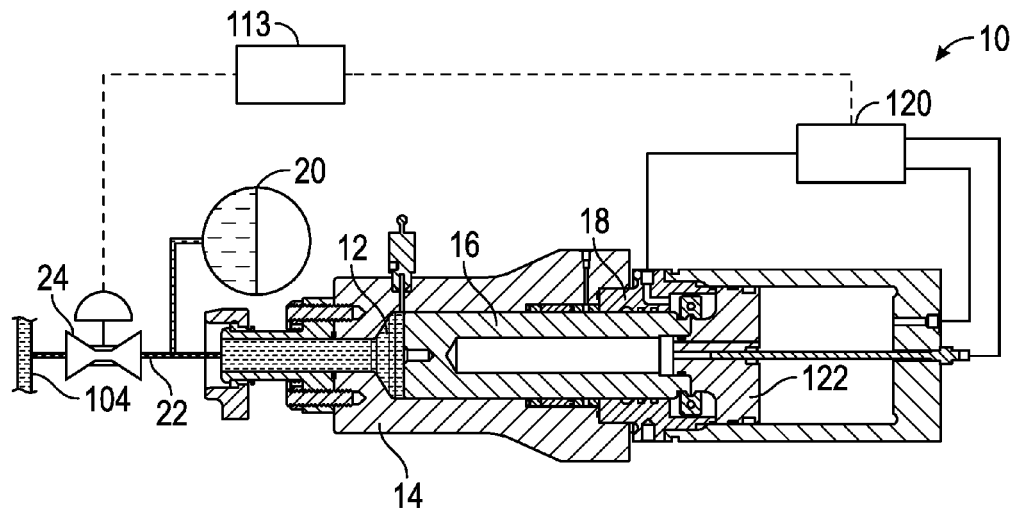
FIG. 5A is a schematic diagram of a tube wave generator at the beginning of a cycle with the plunger at the bottom of its stroke, the firing valve open and the accumulator compressed or relaxed in neutral position in accordance with embodiments of the present disclosure.
Figure 5B:
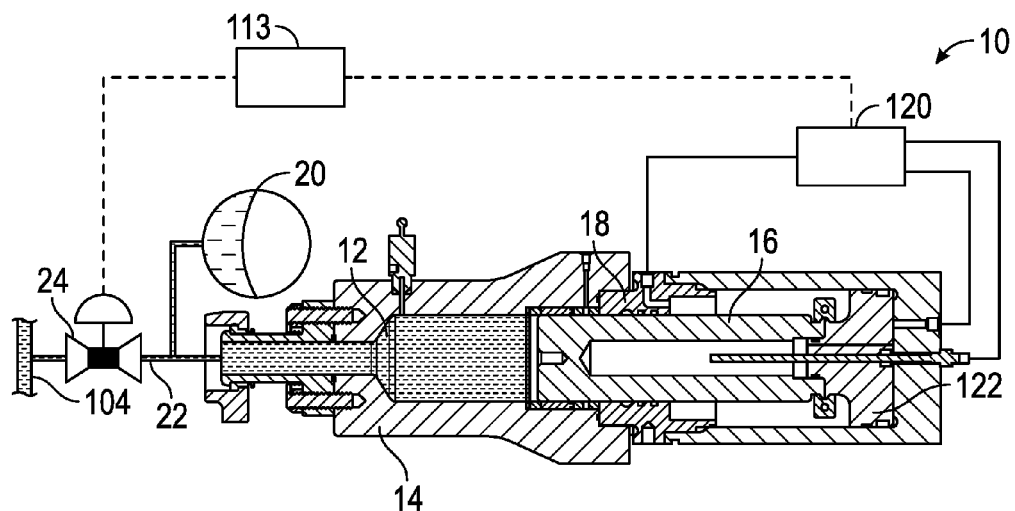
FIG. 5B is a schematic diagram of the tube wave generator of FIG. 5A shown in the armed position with the plunger at the top of its stroke, the firing valve closed, and the accumulator expanded in accordance with embodiments of the present disclosure.
Figure 5C:
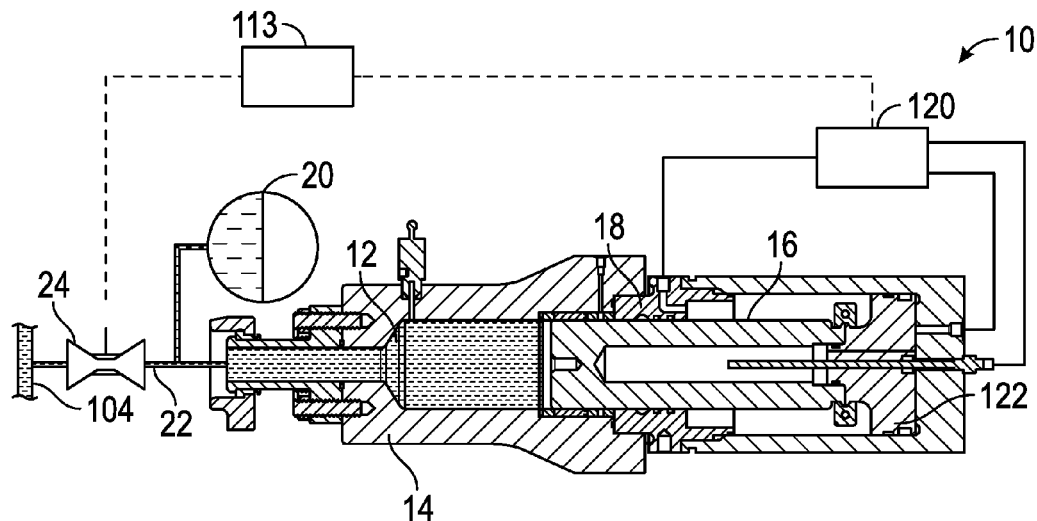
FIG. 5C is a schematic diagram of the tube wave generator of FIG. 5B shown at the end of a cycle following activation with the firing valve opened and the accumulator compressed or relaxed in neutral position in accordance with embodiments of the present disclosure.

FIG. 5A-5C show an operational cycle of the tube wave generator 10 (FIGS. 1A-1X) to produce a negative pressure wave using the accumulator 20. In FIG. 5A, following reset after the end of a previous cycle, the plunger 16 is at the bottom of its stroke, the firing valve 24 is open and the accumulator 20 is relaxed or compressed relative to the armed configuration. In FIG. 5B, the tube wave generator 10 is shown in the armed position with the plunger 16 at the top of its stroke to create a vacuum or other low pressure condition in the chamber 12, the firing valve 24 is closed, and the accumulator 20 expands into the chamber 12. The valve 24 is then opened to draw fluid into the chamber 12 and relax or compress the accumulator 20 to generate the tube wave. FIG. 5C shows the tube wave generator 10 at the end of the cycle following activation with the firing valve 24 opened and the accumulator 20 compressed or relaxed relative to the armed configuration, ready to begin another reset, arm, and activate cycle.

Figure 6A:
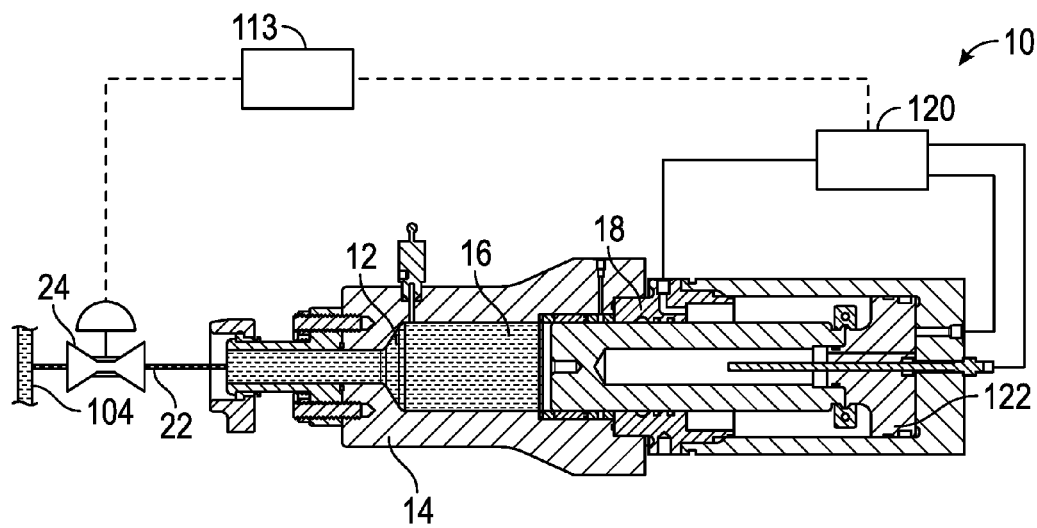
FIG. 6A is a schematic diagram of a tube wave generator in a reset cycle with the valve open and the plunger retracting in accordance with embodiments of the present disclosure.
Figure 6B:
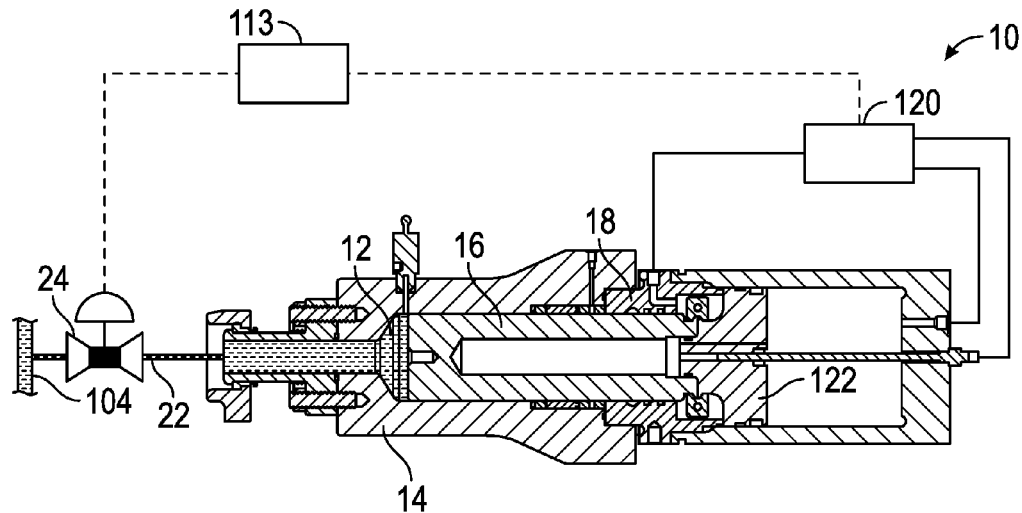
FIG. 6B is a schematic diagram of the tube wave generator of FIG. 6A, shown in an armed position with the valve closed and the plunger at the bottom of the stroke in accordance with embodiments of the present disclosure.
Figure 6C:
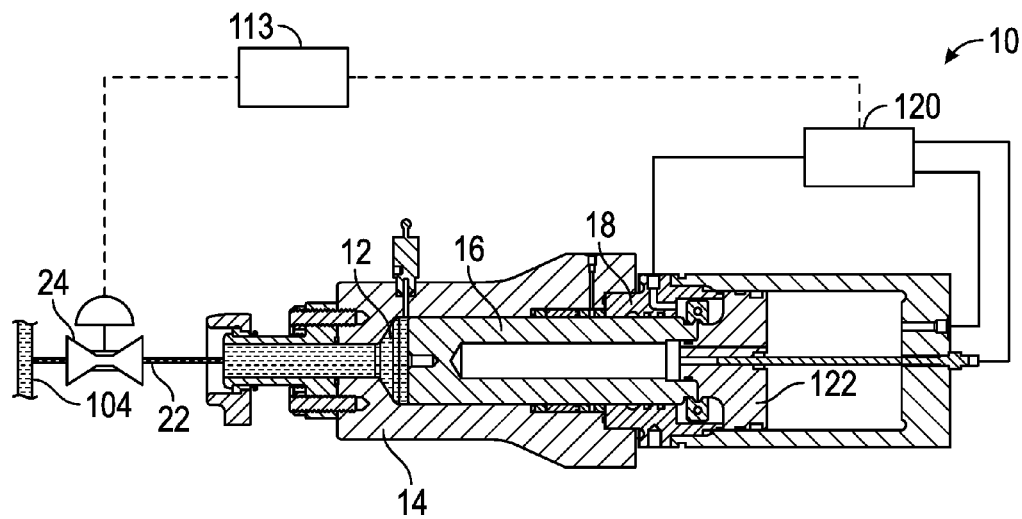
FIG. 6C is a schematic diagram of the tube wave generator of FIG. 6B, shown at the end of a cycle following activation with the valve opened and the plunger at the bottom of the stroke in accordance with embodiments of the present disclosure.

FIGS. 6A-6C show an operational cycle of the tube wave generator 10 (FIGS. 1A-1X) to produce a positive pressure wave without an accumulator 20. In FIG. 6A, following reset after the end of a previous cycle, the plunger 16 is at the top of its stroke, the firing valve 24 is open, and the chamber 12 contains fluid from the tubular system 100 (see FIG. 2) and at the same pressure. In FIG. 6B, the firing valve 24 has been closed and the plunger 16 moved to the bottom of its stroke to pressurize the chamber 12. Then, in FIG. 6C the firing valve 24 is opened to allow fluid to exit the chamber 12 and generate a tube wave, and the pressure to equalize with the tubular system 100. The wave is generated by rapidly opening the firing valve 24 to allow fluid to enter the chamber 12 and equalize the pressure. The generator 10 is then ready to begin another cycle by repeating the reset, arm, and firing steps.

The configurations of the components in the various cycling phases for the different modes of operation shown in FIGS. 3A-6C are listed in Table 1 below.

TABLE 1

Generator cycle/phase configurations

| | Mode FIGS. | | | | | | | | | | |
|---|---|---|---|---|---|---|---|---|---|---|---|
| | 3A-3D | | | 4A-4C | | | 5A-5C | | | 206A-6C | | |
| | Phase (Reset, Arm, Fire) | | | | | | | | | | | |
| | R | A | F | R | A | F | R | A | F | R | A | F |
| Firing valve (open, closed) | O | C | O | O | C | O | O | C | O | O | C | O |
| Plunger stroke (in, out) | I | O | O | O | I | I | I | O | O | O | I | I |
| Chamber status (pressurized, =, vacuum) | = | V | = | = | P | = | = | V | = | = | P | = |
| Accumulator (expanded, =, compressed, none) | N | N | N | = | C | = | = | E | = | N | N | N |
| Tube wave sign (+/−) | | − | | | + | | | − | | | + | |

EMBODIMENTS LISTING

In some aspects, the disclosure herein relates generally to pressure wave generation methods and/or tubular system according to the following Embodiments, among others:

Embodiment 1: A method to generate a tube wave in a tubular system, comprising: reciprocating a fluid end of a plunger in a chamber system to alternatingly increase and decrease a net volume of the chamber system; in response to the reciprocation of the fluid end of the plunger, (cyclically, e.g.) drawing fluid from a tubular system into the chamber system, returning the fluid from the chamber system to the tubular system, and generating a tube wave; and guiding the tube wave through a two-way flow passage to the tubular system.

Embodiment 2: The method of Embodiment 1, further comprising (cyclically, e.g.) opening and closing a firing valve to selectively establish and block fluid communication between the chamber system and the tubular system.

Embodiment 3: The method of Embodiment 2, further comprising opening the firing valve during decrease of the net volume to return the fluid from the chamber system to the tubular system, closing the firing valve during increase of the net volume to create a low pressure condition in the chamber system, and opening the firing valve, e.g., suddenly, to equalize the pressure in the chamber system and guide a negative tube wave to the tubular system.

Embodiment 4: The method of Embodiment 2, further comprising opening the firing valve during increase of the net volume to draw fluid from the tubular system into the chamber system, closing the firing valve during decrease of the net volume to create a high pressure condition in the chamber system, and opening the firing valve, e.g., suddenly, to equalize the pressure in the chamber system and guide a positive tube wave to the tubular system.

Embodiment 5: The method of any preceding Embodiment, further comprising (cyclically, e.g.) expanding and compressing a gas-charged accumulator in the chamber system.

Embodiment 6: The method of Embodiment 5, further comprising opening the firing valve during increase of the net volume to draw fluid from the tubular system into the chamber system, closing the firing valve during decrease of the net volume to compress the accumulator, opening the firing valve, e.g., suddenly, to expand the accumulator and return fluid from the chamber system to the tubular system, and guiding a positive tube wave to the tubular system.

Embodiment 7: The method of Embodiment 5, further comprising further comprising opening the firing valve during reduction of the net volume to return fluid from the chamber system to the tubular system, closing the firing valve during increase of the net volume to create a low pressure condition in the chamber system and expand the accumulator, and opening the firing valve, e.g., suddenly, to draw fluid into the chamber system and compress the accumulator, and guiding a negative tube wave to the tubular system.

Embodiment 8: The method of Embodiment 1, further comprising rapidly cycling the plunger between net volume increase and decrease while maintaining fluid communication through the two-way passage to propagate a cyclical tube wave through the two-way passage to the tubular system.

Embodiment 9: The method of any preceding Embodiment, further comprising acoustically pairing the two-way flow passage and a stub together to form a spaced-pair resonator, and conditioning the guided tube wave in the spaced-pair resonator to strengthen the tube wave or filter noise from the tube wave.

Embodiment 10: A method to generate a tube wave in a pressurized tubular system, comprising (a) establishing fluid communication between a fluid-filled, pressurized tubular system and an enclosed chamber system containing the fluid to equalize the pressure; (b) isolating the enclosed chamber system from the tubular system (e.g., closing a firing valve); (c) changing the pressure of the fluid in the isolated, enclosed chamber system (e.g., moving a plunger); (d) reestablishing fluid communication between the enclosed chamber system to equalize the pressure and generate a tube wave (e.g., opening the firing valve, or suddenly opening the firing valve); and (e) guiding the tube wave to the tubular system.

Embodiment 11: The method of Embodiment 10, further comprising opening and closing a firing valve to selectively isolate the enclosed chamber system in (b) and reestablish the fluid communication in (d), respectively.

Embodiment 12: The method of Embodiment 10 or Embodiment 11, further comprising sliding a plunger through a sealed port into the enclosed chamber system to an armed position in (c) and reciprocating the plunger to a reset position following (d).

Embodiment 13: The method of any preceding Embodiment, wherein the pressure in the isolated, enclosed chamber system is increased in (c), and wherein a positive tube wave is generated in (d).

Embodiment 14: The method of Embodiment 13, further comprising compressing an accumulator in the chamber system in (c) and expanding the accumulator in (d).

Embodiment 15: The method of Embodiment 10, wherein the pressure in the isolated, enclosed chamber system is decreased in (c), and wherein a negative tube wave is generated in (d).

Embodiment 16: The method of Embodiment 15, further comprising expanding an accumulator in the chamber system in (c) and compressing the accumulator in (d).

Embodiment 17. The method of any one of Embodiments 2-16, wherein the firing valve is a fast-acting valve;

and/or configured to open or close in period of time less than about 500 milliseconds, or less than about 200 milliseconds, or less than about 120 milliseconds, or less than about 100 milliseconds.

Embodiment 18. The method of any one of Embodiments 2-16 and 31 or the system of any one of Embodiments 17-31, wherein the firing valve is a regenerative valve.

Embodiment 19. The method of any one of Embodiments 1-18, wherein the fluid is a liquid filling the tubular system.

Embodiment 20. The method of any one of Embodiments 1-19, wherein the low pressure condition is at least 345 kPa (50 psi) below the pressure of the tubular system, or at least 1.38 MPa (200 psi) below the pressure of the tubular system, or at least 3.45 MPa (500 psi) below the pressure of the tubular system.

Embodiment 21. The method of any one of Embodiments 1-20, wherein the high pressure condition is at least 345 kPa (50 psi) above the pressure of the tubular system, or at least 1.38 MPa (200 psi) above the pressure of the tubular system, or at least 3.45 MPa (500 psi) above the pressure of the tubular system.

Embodiment 22. The method of any one of Embodiments 1-21, wherein the high pressure condition is at least 20% above the pressure of the tubular system, or at least twice the pressure of the tubular system, or at least five times the pressure of the tubular system, and or up to ten times the pressure of the tubular system.

Embodiment 23. The method of any one of Embodiments 1-22, wherein drawing fluid from the tubular system into the chamber system, returning the fluid from the chamber system to the tubular system, and generating the tube wave, are cyclical.

Embodiment A1: A tube wave generator-sensor system, comprising (a) a chamber system, (b) a plunger slidable through a seal into the chamber system, (c) a driver to reciprocate a fluid end of the plunger within the chamber system toward and away from the seal to generate a tube wave, (d) a two-way flow passage from the chamber system to guide the tube wave into a tubular system; and (e) a sensor to receive the tube wave signal, a response to the tube wave signal, or a combination thereof from the tubular system.

Embodiment A2: The system of Embodiment A1, further comprising a firing valve to selectively open and close the two-way passage.

Embodiment A3: The system of Embodiment A2, further comprising a controller to cycle the system through pressure wave generation arming, firing (or activation), and reset phases.

Embodiment A4. The system of Embodiment A3, wherein the reset phase comprises opening the firing valve during insertion of the plunger to displace fluid from the chamber system into the tubular system, wherein the arming phase comprises closing the firing valve during retraction of the plunger to create a low pressure condition in the chamber system, and wherein the firing phase comprises opening the firing valve, e.g., suddenly, to allow fluid to enter the chamber system and generate a negative tube wave in the tubular system.

Embodiment A5: The system of Embodiment A3, wherein the reset phase comprises opening the firing valve during retraction of the plunger to draw fluid from the tubular system into the chamber system, wherein the arming phase comprises closing the firing valve during insertion of the plunger to create a high pressure condition in the chamber system, and wherein the firing phase comprises opening the firing valve, e.g., suddenly, to allow fluid egress from the chamber system and generate a positive tube wave in the tubular system Embodiment A6: The system of any one of Embodiments A2-A5, further comprising a gas accumulator in the chamber system.

Embodiment A7: The system of Embodiment A6, further comprising a controller to cycle the system through pressure wave generation arming, firing (or activation), and reset phases.

Embodiment A8. The system of Embodiment A7, wherein the reset phase comprises opening the firing valve during retraction of the plunger to draw fluid from the tubular system into the chamber system, wherein the arming phase comprises closing the firing valve during insertion of the plunger to create a high pressure condition in the accumulator, and wherein the firing phase comprises opening the firing valve, e.g., suddenly, to allow fluid egress from the chamber system, expansion of the accumulator, and generation of a positive tube wave in the tubular system.

Embodiment A9. The system of Embodiment A7, wherein the reset phase comprises opening the firing valve during insertion of the plunger to displace fluid from the chamber system into the tubular system, wherein the arming phase comprises closing the firing valve during retraction of the plunger to create a low pressure condition in the accumulator, and wherein the firing phase comprises opening the firing valve, e.g., suddenly, to allow fluid to enter the chamber system, compress the accumulator, and generate a negative tube wave in the tubular system.

Embodiment A10. The system of any one of Embodiments A1-A9, further comprising a high power drive to rapidly cycle the plunger between insertion and retraction to propagate a cyclical tube wave through the two-way passage into the tubular system.

Embodiment A11. The system of any one of Embodiments A1-A10, wherein the driver comprises a direct action drive.

Embodiment A12. The system of any one of Embodiments A1-A10, wherein the driver comprises a cylinder drive.

Embodiment A13. The system of any one of Embodiments A1-A10, wherein the driver comprises a double rod drive.

Embodiment A14. The system of any one of Embodiments A1-A13, further comprising a lateral branch connected to the tubular system opposite the two-way flow passage to acoustically pair the lateral branch with the two-way flow passage and together form a spaced-pair pressure wave resonator having a resonant frequency to strengthen the tube wave or to filter a noise portion of the tube wave having the resonant frequency.

Embodiment A15. The system of any one of Embodiments A1-A14, wherein the firing valve is a fast-acting valve; and/or configured to open or close in period of time less than about 500 milliseconds, or less than about 200 milliseconds, or less than about 120 milliseconds, or less than about 100 milliseconds.

Embodiment A16. The system of any one of Embodiments A1-A15, wherein the firing valve is a regenerative valve.

Embodiment A17. The system of any one of Embodiments A1-A16, wherein the fluid is a liquid filling the tubular system.

Embodiment A18. The system of any one of Embodiments A1-A17, wherein the low pressure condition is at least 345 kPa (50 psi) below the pressure of the tubular system, or at least 1.38 MPa (200 psi) below the pressure of the tubular system, or at least 3.45 MPa (500 psi) below the pressure of the tubular system.

Embodiment A19. The system of any one of Embodiments A1-A18, wherein the high pressure condition is at least 345 kPa (50 psi) above the pressure of the tubular system, or at least 1.38 MPa (200 psi) above the pressure of the tubular system, or at least 3.45 MPa (500 psi) above the pressure of the tubular system.

Embodiment A20. The system of any one of Embodiments A1-A19, wherein the high pressure condition is at least 20% above the pressure of the tubular system, or at least twice the pressure of the tubular system, or at least five times the pressure of the tubular system, and or up to ten times the pressure of the tubular system.

Although only a few exemplary embodiments have been described in detail above, those skilled in the art will readily appreciate that many modifications are possible in the example embodiments without materially departing from this disclosure. For example, any embodiments specifically described may be used in any combination or permutation with any other specific embodiments described herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112(f) for any limitations of any of the claims herein, except for those in which the claim expressly uses the words 'means for' or 'step for' together with an associated function without the recitation of structure.

What is claimed is:

1. A method to generate a tube wave in a tubular system, comprising:
   reciprocating a fluid end of a plunger in a chamber system to alternatingly increase and decrease a net volume of the chamber system, wherein the chamber system is a closed system when a firing valve is closed;
   expanding and compressing an accumulator in the chamber system;
   in response to the reciprocation of the fluid end of the plunger, drawing fluid from a tubular system into the chamber system, returning the fluid from the chamber system to the tubular system, and generating a tube wave;
   guiding the tube wave through a two-way flow passage to the tubular system;
   opening and closing the firing valve to selectively establish and block fluid communication between the chamber system and the tubular system.

2. The method of claim 1, further comprising opening the firing valve during decrease of the net volume to return the fluid from the chamber system to the tubular system, closing the firing valve during increase of the net volume to create a low pressure condition in the closed chamber system, and opening the firing valve to equalize the pressure in the chamber system and guide a negative tube wave to the tubular system.

3. The method of claim 1, further comprising opening the firing valve during increase of the net volume to draw fluid from the tubular system into the chamber system, closing the firing valve during decrease of the net volume to create a high pressure condition in the closed chamber system, and opening the firing valve to equalize the pressure in the chamber system and guide a positive tube wave to the tubular system.

4. The method of claim 1, further comprising opening the firing valve during increase of the net volume to draw fluid from the tubular system into the chamber system, closing the firing, valve during decrease of the net volume to compress the accumulator, opening the firing valve to expand the accumulator and return fluid from the chamber system to the tubular system, and guiding a positive tube wave to the tubular system.

5. The method of claim 1, further comprising opening the firing valve during reduction of the net volume to return fluid from the chamber system to the tubular system, closing the firing valve during increase of the net volume to create a low pressure condition in the closed chamber system and expand the accumulator, opening the firing valve to draw fluid into the chamber system and compress the accumulator, and guiding a negative tube wave to the tubular system.

6. The method of claim 1, further comprising rapidly cycling the plunger between net volume increase and decrease while maintaining fluid communication through the two-way passage to propagate a cyclical tube wave through the two-way passage to the tubular system.

7. The method of claim 1, further comprising acoustically pairing the two-way flow passage and a stub together to form a spaced-pair resonator, and conditioning the guided tube wave in the spaced-pair resonator to strengthen the tube wave or filter noise from the tube wave.

8. A method to generate a tube wave in a pressurized tubular system, comprising:
   (a) establishing fluid communication to equalize pressure between a fluid-filled, pressurized tubular system and an enclosed chamber system containing the fluid;
   (b) isolating the enclosed chamber system from the tubular system;
   (c) changing the pressure of the fluid in the isolated, enclosed chamber system;
   (d) reestablishing fluid communication between the enclosed chamber system to equalize the pressure and generate a tube wave; and
   (e) guiding the tube wave to the tubular system.

9. The method of claim 8, further comprising opening and closing a firing valve to selectively isolate the enclosed chamber system in (b) and reestablish the fluid communication in (d), respectively.

10. The method of claim 8, further comprising sliding a plunger through a sealed port into the enclosed chamber system to an armed position in (c) and reciprocating the plunger to a reset position following (d).

11. The method of claim 8, wherein the pressure in the isolated, enclosed chamber system is increased in (c), and wherein a positive tube wave is generated in (d).

12. The method of claim 11, further comprising compressing an accumulator in the chamber system in (c) and expanding the accumulator in (d).

13. The method of claim 8, wherein the pressure in the isolated, enclosed chamber system is decreased in (c), and wherein a negative tube wave is generated in (d).

14. The method of claim 13, further comprising expanding an accumulator in the chamber system in (c) and compressing the accumulator in (d).

15. A tube wave generator-sensor system, comprising:
(a) an enclosed fluid chamber system;
(b) a plunger slidable through a seal into the chamber system;
(c) a driver to reciprocate a fluid end of the plunger toward and away from the seal;
(d) a two-way fluid flow passage to guide a tube wave signal between the chamber system and a tubular system;
(e) a firing valve to selectively open and close the two-way passage; and
(f) a sensor to receive the tube wave signal, a response to the tube wave signal, or a combination thereof from the tubular system.

16. The tube wave generator-sensor system of claim 15, further comprising a controller to cycle the tube wave generator-sensor system through reset, arming, and activation phases, wherein the reset phase comprises opening the firing valve during insertion of the plunger to displace fluid from the chamber system into the tubular system, wherein the arming phase comprises closing the firing valve during retraction of the plunger to create a low pressure condition in the chamber system, and wherein the firing phase comprises opening the firing valve to allow fluid to enter the chamber system and generate a negative tube wave in the tubular system.

17. The tube wave generator-sensor system of claim 15, further comprising a controller to cycle the tube wave generator-sensor system through reset, arming, and activation phases, wherein the reset phase comprises opening the firing valve during retraction of the plunger to draw fluid from the tubular system into the chamber system, wherein the arming phase comprises closing the firing valve during insertion of the plunger to create a high pressure condition in the chamber system, and wherein the activation phase comprises opening the firing valve to allow fluid egress from the chamber system and generate a positive tube wave in the tubular system.

18. The system of claim 15, further comprising a gas accumulator in the chamber system.

19. The system of claim 18, further comprising a controller to cycle the system through pressure wave generation arming, firing, and reset phases, wherein the reset phase comprises opening the firing valve during retraction of the plunger to draw fluid from the tubular system into the chamber system, wherein the arming phase comprises closing the firing valve during insertion of the plunger to create a high pressure condition in the accumulator, and wherein the firing phase comprises opening the firing valve to allow fluid egress from the chamber system, expansion of the accumulator, and generation of a positive tube wave in the tubular system.

20. The system of claim 18, further comprising a controller to cycle the system through pressure wave generation arming, firing (or activation), and reset phases, wherein the reset phase comprises opening the firing valve during insertion of the plunger to displace fluid from the chamber system into the tubular system, wherein the arming phase comprises closing the firing valve during retraction of the plunger to create a low pressure condition in the accumulator, and wherein the firing phase comprises opening the firing valve to allow fluid to enter the chamber system, compress the accumulator, and generate a negative tube wave in the tubular system.

21. The system of claim 15, further comprising a high power drive to rapidly cycle the plunger between insertion and retraction to propagate a cyclical tube wave through the two-way passage into the tubular system.

22. The system of claim 15, wherein the drive comprises a cylinder drive.

23. The system of claim 15, wherein the drive comprises a direct action hydraulic drive.

24. The system of claim 15, wherein the drive comprises a double rod drive.

25. The system of claim 15, further comprising a lateral branch connected to the tubular system opposite the two-way flow passage to acoustically pair the lateral branch with the two-way flow passage and together form a spaced-pair pressure wave resonator having a resonant frequency to strengthen the tube wave or to filter a noise portion of the tube wave having the resonant frequency.

* * * * *